US012156776B1

(12) United States Patent
Grauer et al.

(10) Patent No.: US 12,156,776 B1
(45) Date of Patent: Dec. 3, 2024

(54) DENTAL COSMETIC KIT AND METHOD OF USE

(71) Applicant: Dental Makeup, Inc., Pacific Palisades, CA (US)

(72) Inventors: Dan Grauer, Pacific Palisades, CA (US); Amir Mansouri, Los Angeles, CA (US); Elahe Ahmady, Los Angeles, CA (US)

(73) Assignee: Dental Makeup, Inc.

( * ) Notice: Subject to any disclaimer, the term of this patent is extended or adjusted under 35 U.S.C. 154(b) by 0 days.

(21) Appl. No.: 18/462,089

(22) Filed: Sep. 6, 2023

Related U.S. Application Data

(60) Provisional application No. 63/404,375, filed on Sep. 7, 2022.

(51) Int. Cl.
| | |
|---|---|
| *A61C 5/30* | (2017.01) |
| *A61C 13/08* | (2006.01) |
| *A61C 13/15* | (2006.01) |
| A61C 9/00 | (2006.01) |

(52) U.S. Cl.
CPC .............. *A61C 5/30* (2017.02); *A61C 13/082* (2013.01); *A61C 19/004* (2013.01); *A61C 9/0006* (2013.01); *A61C 9/0046* (2013.01)

(58) Field of Classification Search
CPC ........... A61C 5/20; A61C 5/30; A61C 13/082; A61C 19/004; A61C 9/0006; A61C 9/0046
USPC ........................................................ 433/226
See application file for complete search history.

(56) References Cited

U.S. PATENT DOCUMENTS

| | | | | |
|---|---|---|---|---|
| 5,482,464 | A * | 1/1996 | Shimosawa ............ | A61C 13/08 433/226 |
| 6,210,163 | B1 * | 4/2001 | Cohen .................... | A61C 19/10 106/35 |
| 8,926,327 | B2 * | 1/2015 | Massad .............. | A61C 13/0001 433/213 |
| 2005/0227204 | A1 * | 10/2005 | Hauck ...................... | A61C 5/20 433/218 |
| 2007/0298381 | A1 * | 12/2007 | Collodoro ................ | A61C 5/20 433/180 |
| 2009/0004629 | A1 * | 1/2009 | Fishman ................ | A61C 13/08 433/217.1 |
| 2015/0366643 | A1 * | 12/2015 | Schlüter ................... | A61C 5/20 433/218 |

(Continued)

*Primary Examiner* — Matthew M Nelson
(74) *Attorney, Agent, or Firm* — Jafari Law Group, Inc.

(57) ABSTRACT

A do-it-yourself dental cosmetic system and method, enabling users to create a temporary dental cosmetic effect. In some embodiments, a kit including a dental cosmetic composition is provided for creating a cosmetic effect on a tooth surface; the user is instructed to mold, smear, or contour the composition, which is adapted to harden onto the tooth surface to create the cosmetic effect. After limited use (e.g., hours rather than days), the user removes the composition from the tooth surface. In some embodiments, a kit includes the composition and instructions for receiving disposable veneers adapted to removably adhere to the tooth with the composition. The service provider receives dental data from the user and creates the disposable veneers based on the data. Instructions are provided to the user for applying the disposable veneers with the composition, and adhering the disposable veneers, each to one tooth, to create a dental cosmetic effect.

10 Claims, 10 Drawing Sheets

(56) References Cited

U.S. PATENT DOCUMENTS

2021/0315665 A1\* 10/2021 Mishaeloff ............... A61C 5/20

\* cited by examiner

SECTION A-A'

SECTION B-B'

DENTAL COSMETIC KIT AND METHOD OF USE

PRIORITY AND RELATED APPLICATIONS

This application claims priority to U.S. Provisional Application No. 63/404,375, filed on Sep. 7, 2022, the disclosure of which is incorporated by reference in its entirety.

TECHNICAL FIELD

The present invention generally relates to dental cosmetic procedures. More specifically, the present invention relates to "do-it-yourself" dental cosmetic procedures that are implemented entirely or primarily by consumers rather than professionals. The dental cosmetic procedures are aimed at enhancing the shape, color, alignment, texture, size or form of the user's teeth.

BACKGROUND OF THE INVENTION

The prior art is littered with different devices designed to apply different treatments to the teeth of a patient. Yet, most of these devices are specifically designed to be used by trained professionals, such as general dentists or highly specialized dentists in a variety of fields. Moreover, while much of the prior art focuses on treatments such as teeth whitening treatments, there appears to be a shortcoming of teachings that focuses on other cosmetic aspects of a user's teeth that do not involve requiring a professional practitioner to apply or perform the treatment. For example, there is a shortcoming of teachings that address devices and methods for individual, untrained consumers or users, to be enabled or facilitated with a means for addressing common problems with their teeth such as self-treatment of a chipped edge of a tooth, self-treatment of a discoloration by covering the discoloured area, improving a shape and contour of a deficient tooth, masking crookedness, or other cosmetic aspects of a person's teeth that may be addressed by a user or consumer without the need of a professionally trained dentist.

Another example is the use of veneers. Traditional veneers are intricately crafted by skilled cosmetic dentists within the confines of a professional dental clinic. These dentists employ either digital or traditional analog methods to capture a precise impression of a patient's teeth. Each veneer is then thoughtfully and meticulously designed to ensure it fits perfectly with the patient's individual smile and esthetic desires. Once ready, these veneers are individually applied, tooth by tooth, using a durable adhesive or cement. This ensures a long-term bond to the tooth's surface, providing a lasting and natural-looking transformation.

The traditional veneer application process presents multiple challenges that potential users need to be aware of:
1) Financial Implications: One of the foremost challenges is the associated cost. In the United States, the price of this procedure can range anywhere from $1,000 to $4,000 for each tooth. This means that for a set of eight to ten veneers, a patient could be looking at an expenditure exceeding $30,000-40,000. Such a steep price point renders this cosmetic enhancement unfeasible for many, putting it beyond the reach of those who might otherwise be interested;
2) Impact on Natural Teeth: Another significant concern is the invasive nature of the procedure. To ensure the permanent affixation of the veneers to the teeth, dental professionals typically need to reshape the patient's natural teeth. This involves grinding and sizing them down, a process that irrevocably alters and can damage the original tooth structure. Such an irreversible measure deters most potential patients. The idea of permanently compromising their healthy teeth, especially when there's nothing medically wrong with them, can be a significant deterrent, making many individuals hesitant to pursue this cosmetic solution.

In light of the above-mentioned drawbacks, there is a need for an improved dental cosmetic system and method configured to provide easy and efficient ways to apply a cosmetic composition on a treatment surface of a user's tooth. A need for a do-it-yourself dental cosmetic system and method, enabling users to create a temporary dental cosmetic effect, which the prior art does not adequately address.

It is to these ends that the present invention has been developed.

SUMMARY OF THE INVENTION

The present invention generally discloses a system that facilitates "do-it-yourself" dental cosmetic procedures, which are implemented entirely or primarily by consumers rather than professionals. The dental cosmetic procedures are aimed at enhancing the shape, color, alignment, texture, size or form of the user's teeth. In some exemplary embodiments, users are provided with a kit including a cosmetic applicator device for printing, depositing, delivering, or applying a durably removable composition to a treatment surface to fix cosmetic problems associated with the user's teeth. In some exemplary embodiments, users are provided with a kit including instructions for submitting to a service provider the user's dental data; the dental data is used to create custom, disposable veneers that are returned to the user with instructions for self-application. The durably removable composition provided to consumers may be a photosensitive composition that cures with a curing light source, or a composition that cures chemically upon mixing with one or more activating substances that activate a curing reaction, or a composition that is heat cured. Although durable for a relatively short period of time (i.e., hours rather than days), the composition is easily removed and thus suitable for temporary cosmetic applications.

Dental Cosmetic Applicator

In one aspect of the invention, a dental cosmetic applicator is provided. The cosmetic applicator device is designed to be used by a consumer or user for printing a composition to the treatment surface, for example, a tooth of the user. In an exemplary embodiment, the cosmetic applicator is a device for applying uncured composition on a treatment surface, and comprises: an elongated body having a cavity configured to hold the uncured composition; a dispenser located at one end of the elongated body configured to dispense the uncured composition on the treatment surface, and a light module located on the elongated body configured to illuminate a curing light onto the uncured composition, thereby hardening the composition onto the treatment surface to fix cosmetic problems associated with a user. In one embodiment, the device is a hand-held device.

In one embodiment, the device contains the composition that is applied to a treatment surface to fix cosmetic problems. In one embodiment, the device is used for printing, depositing, delivering, or applying the composition to the treatment surface, for example, at least one tooth, for fixing any dental problems such as a chipped edge of a tooth, a discoloration by covering the discoloured area, improving a shape and contour of a deficient tooth, masking crookedness, or other cosmetic aspects of a person's teeth that may be addressed by a user or consumer without the need of a professionally trained dentist.

In one embodiment, the device comprises an elongated body. The elongated body comprises a cavity configured to hold the composition. In one embodiment, the device further comprises a dispenser. In one embodiment, the dispenser is located at any one end of the elongated body configured to dispense an uncured composition on the treatment surface via a tip. In one embodiment, the dispenser comprises one or more filaments to apply the uncured composition on the treatment surface. In one embodiment, the dispenser comprises a roller device or roller tip to apply the uncured composition on the treatment surface. In one embodiment, the dispenser comprises a nozzle to apply the uncured composition on the treatment surface.

In one embodiment, the device further comprises a light module configured to illuminate/radiate a curing light. In one embodiment, the light module is attached to another end of the elongated body. In one embodiment, the light module may be positioned on the elongated body. The device allows the user to point the curing light onto the composition applied to the treatment surface. In one embodiment, the curing light hardens the composition onto the treatment surface of the user to cure any cosmetic problems associated with the user. In one embodiment, the composition cures dental problems when exposed to the curing light.

In one embodiment, the device further comprises a protective shield. In one embodiment, the protective shield is provided around the light module. In one embodiment, the protective shield is used to keep the composition uncured within the device. In one embodiment, the protective shield is further used to protect the user's eyes from the curing light while using the device.

In another embodiment, the device for applying a composition on a treatment surface is disclosed. The device comprises a tubular member extends from a base. The tubular member comprises a flow path extends from the base and opens at a tip of the tubular member. The device further comprises an outer member extends from the base and at least partially surrounds the tubular member. Further, at least a portion of the tubular member tapers towards the tip. In one embodiment, the device is made of silicone-based material. The device is configured to attach to a syringe type applicator device comprising the composition. The device is configured to dispense composition from the applicator device through the tubular member.

In some embodiments, the composition may include ingredients that enhance or protect the tooth structure. In some exemplary embodiments, the composition includes Fluoride to protect the tooth structure. In some embodiments, the composition may include ingredients that improve or enhance the user's breath. In some embodiments, the composition may include supplements such as vitamins, including to improve or aid the user's dental health.

Method of Use by Untrained Consumers

In another aspect of the invention, a method is provided, to be performed by a consumer rather than a professional, for creating a cosmetic effect on a treatment surface of a tooth. The method may include: providing a dental cosmetic applicator with an applicator tip, and a dental cosmetic composition sealed inside the dental cosmetic applicator, wherein the dental cosmetic composition is removably durable; applying onto the treatment surface a portion of the dental cosmetic composition; molding, using the applicator tip, the portion of the dental cosmetic composition to create a cosmetic effect on the treatment surface of the tooth; and curing the dental cosmetic composition onto the treatment surface.

A similar method for creating a dental cosmetic effect may involve providing the user with an applicator and applicator kit, including instructions for the user to follow. In exemplary embodiments, this method may include providing a user with a dental cosmetic application kit including: a dental cosmetic applicator, an applicator tip, and a durably removable composition adapted to adhere and harden onto a surface of a tooth; and providing the user with instructions for creating the dental cosmetic effect, wherein the instructions are adapted to guide the user to: apply onto a surface of a tooth of the user a portion of the durably removable composition; mold, smear, or contour the portion of the durably removable composition using the applicator tip to create the cosmetic effect on the tooth; and remove the durably removable composition from the surface of the tooth upon expiration of a predetermined range of time, using a scrapper tool or fingernail of the user.

In some exemplary embodiments, curing the dental cosmetic composition includes either: treating the treatment surface with a curing light to cure the dental cosmetic composition onto the treatment surface, or mixing one or more activating substances with the dental cosmetic composition to cure the dental cosmetic composition onto the treatment surface.

In some exemplary embodiments, the method may further comprise of preparing the treatment surface, including cleaning or dehydrating the treatment surface.

In some exemplary embodiments, creating the cosmetic effect on the treatment surface includes one of the following: masking a surface defective in size of one or more teeth; masking a surface defective in contour of one or more teeth; enhancing a size, a length, or a width of one or more teeth; or treating a discoloration of the treatment surface.

In some exemplary embodiments, the method may further comprise of selecting, from a color guide provided to the consumer, a color to match with a tooth color of the treatment surface of the tooth before applying the dental cosmetic composition.

Upon completed use, the user may remove the cured dental cosmetic composition from the surface of their tooth, for example, simply by removing the cured dental cosmetic composition from the treatment surface using a scrapper tool or a fingernail.

In yet another aspect of the invention, a method of using a dental cosmetic applicator in accordance with the present disclosure is provided. The method may exemplarily comprise of the following steps: cleaning and dehydrating the treatment surface; printing, depositing, delivering, or applying onto the treatment surface the composition; treating the treatment surface with a curing light to harden the composition on the treatment surface, and removing the hardened composition from the treatment surface after a certain period upon curing the treatment surface.

In exemplary embodiments, treating the treatment surface may include treating a discoloration of one or more teeth, masking a crookedness of one or more teeth, treating a defective surface in size or contour of one or more teeth, enhancing of the size, length, or width of one or more teeth. As may be appreciated by a person of ordinary skill in the art, a user can, without the need of professional treatment, treat a surface of a tooth to enhance the appearance or fix cosmetic problems associated with one or more of the user's teeth.

In some exemplary embodiments, printing, depositing, delivering, or applying onto the treatment surface the composition includes printing the composition on at least one region on the tooth. In some exemplary embodiments, printing, depositing, delivering, or applying onto the treatment surface the composition, includes printing, depositing, delivering, or applying the composition on at least one chipped tooth. In some exemplary embodiments, printing, depositing, delivering, or applying onto the treatment surface the composition, includes printing, depositing, delivering, or applying the composition on a discolored tooth or discolored region of a tooth. In some exemplary embodiments, printing, depositing, delivering, or applying onto the treatment surface the composition, includes printing, depositing, delivering, or applying the composition on a tooth for improving a shape and contour of a deficient tooth. In some exemplary embodiments, printing, depositing, delivering, or applying onto the treatment surface the composition, includes printing, depositing, delivering, or applying the composition on a tooth for masking a crookedness of the tooth.

In one embodiment, the composition is a durable removable material. In one embodiment, the hardened composition may be removed with a tool provided to the user to scrape the composition and separate it from the treated tooth, such as a scrapper tool or even instructing the user on how to use their fingernail to remove the composition from the tooth.

In one embodiment, the user selects the most appropriate color using a color guide to match the tooth color before applying the composition. In one embodiment, the user applies one or more layers of composition to the treatment surface. In one embodiment, each layer of composition applied by the user is cured using the curing light. In one embodiment, the one or more layers include a first layer, one or more intermediate layers, and a last layer or gloss layer. In one embodiment, the user may preferably or additionally put the gloss layer on top of the cured layers and cure the gloss layer after some time using the curing light.

Disposable Temporary Custom Veneers

In another aspect of the present invention, a method for creating a dental cosmetic effect that involves a service provider providing a consumer disposable veneers that are customized of the user's smile, or to a desired smile look the user desires to temporarily wear. In some exemplary embodiments, the method includes the steps of: providing to a user a dental cosmetic application kit including a first set of instructions for receiving one or more disposable veneers adapted to removably adhere to a surface of a tooth with a durably removable composition, having a stronger adhesion to a surface of a disposable veneer than to the surface of the tooth; requesting or receiving, from the user, dental data associated with the user including an analog dental impression or a dental scan of the user; creating the one or more disposable veneers based on the dental data; providing the user with the one or more disposable veneers; and providing the user with a second set of instructions adapted to guide the user to: apply onto a surface of a tooth of the user or a surface of a disposable veneer a portion of the durably removable composition; and adhere the disposable veneer to the tooth, wherein a remainder of the one or more disposable veneers are optionally adhered to the dental arch of the user, one veneer to one tooth, to create the dental cosmetic effect.

In some exemplary embodiments, the method further includes requesting or receiving from the user images of facial features of the user, including at least a smile of the user. In some exemplary embodiments, the images include at least one video of facial features of the user. In some exemplary embodiments, the instructions require that the smile of the user comprise a smile with an open mouth.

In some exemplary embodiments, the method further includes providing the user with a survey requesting that the user describe a reason for seeking the cosmetic effect. In some exemplary embodiments, the method further includes the second set of instructions further guide the user to cure the durably removable composition onto the surface of the tooth.

In some exemplary embodiments, the method further incudes providing the user with a curing light, wherein the second set of instructions further guide the user to treat the durably removable composition with the curing light to cure the durably removable composition onto the surface of the tooth.

In some exemplary embodiments, the method further incudes providing the user with one or more activating substances, wherein the second set of instructions further guide the user to mix the one or more activating substances with the durably removable composition to cure the durably removable composition onto the surface of the tooth.

In some exemplary embodiments, the method further includes providing the user with a cleaning or dehydrating solution, wherein the second set of instructions further guide the user to prepare the tooth by cleaning or dehydrating the surface of the tooth.

In some exemplary embodiments, the method further incudes providing the user with a scrapper tool, and or instructions for removing the disposable veneer or the durably removable composition from the surface of the tooth using the scrapper tool or a fingernail of the user. In some exemplary embodiments, the second set of instructions further guide the user to remove the disposable veneer or the durably removable composition from the surface of the tooth using upon expiration of a predetermined range of time.

Various objectives and advantages of the present invention will become apparent from the following description taken in conjunction with the accompanying drawings wherein are set forth, by way of illustration and example, certain embodiments of this invention. The drawings submitted herewith constitute a part of this specification, include exemplary embodiments of the present invention, and illustrate various objects and features thereof.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION OF EXAMPLE EMBODIMENTS

Figure 1:
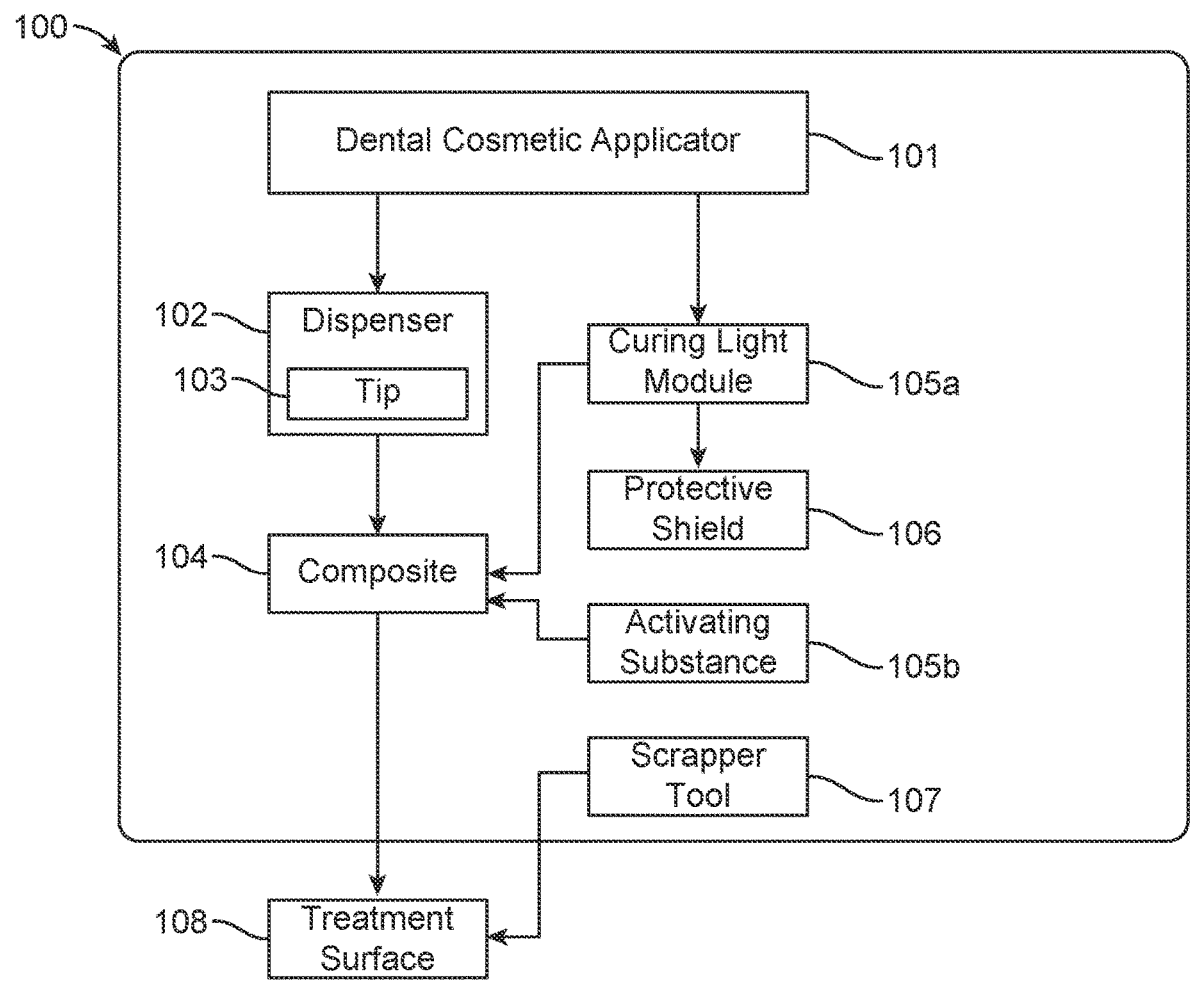
FIG. 1 illustrates a block diagram of a dental cosmetic applicator system in accordance with some exemplary embodiments of the present invention.

In the following discussion that addresses a number of embodiments and applications of the present invention, reference is made to the accompanying drawings that form a part thereof, where depictions are made, by way of illustration, of specific embodiments in which the invention may be practiced. It is to be understood that other embodiments may be utilized, and changes may be made without departing from the scope of the invention. Wherever possible, the same reference numbers are used in the drawings and the following description to refer to the same or similar elements.

In the following detailed description, numerous specific details are set forth by way of examples in order to provide a thorough understanding of the relevant teachings. However, it should be apparent to those skilled in the art that the present teachings may be practiced without such details. In other instances, well known structures, components and/or functional or structural relationship thereof, etc., have been described at a relatively high-level, without detail, in order to avoid unnecessarily obscuring aspects of the present teachings.

Throughout the specification and claims, terms may have nuanced meanings suggested or implied in context beyond an explicitly stated meaning. Likewise, the phrase "in one embodiment/example" as used herein does not necessarily refer to the same embodiment and the phrase "in another embodiment/example" as used herein does not necessarily refer to a different embodiment. It is intended, for example, that claimed subject matter include combinations of example embodiments in whole or in part.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and or steps. Thus, such conditional language is not generally intended to imply that features, elements and or steps are in any way required for one or more embodiments, whether these features, elements and or steps are included or are to be performed in any particular embodiment.

The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present. The term "and or" means that "and" applies to some embodiments and "or" applies to some embodiments. Thus, A, B, and or C can be replaced with A, B, and C written in one sentence and A, B, or C written in another sentence. A, B, and or C means that some embodiments can include A and B, some embodiments can include A and C, some embodiments can include B and C, some embodiments can only include A, some embodiments can include only B, some embodiments can include only C, and some embodiments include A, B, and C. The term "and or" is used to avoid unnecessary redundancy. Similarly, terms, such as "a, an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

While exemplary embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the invention or inventions disclosed herein. Accordingly, the following detailed description does not limit the disclosure. Instead, the proper scope of the disclosure is defined by the appended claims.

Generally, the present invention is a do-it-yourself dental cosmetic system and method, enabling users to create a temporary dental cosmetic effect. As will be discussed with reference to the drawings, in some embodiments, a kit including a dental cosmetic composition is provided for creating a cosmetic effect on a tooth surface; the user is instructed to mold, smear, or contour the composition, which is adapted to harden onto the tooth surface to create the cosmetic effect. After limited use (e.g., hours rather than days), the user removes the composition from the tooth surface. In other exemplary embodiment, a kit may include the same or similar composition in addition to instructions for receiving disposable veneers adapted to removably adhere to the tooth with the composition. The service provider receives dental data from the user and creates the disposable veneers based on the data. Instructions are provided to the user for applying the disposable veneers with the composition, and adhering the disposable veneers, each to one tooth, to create a dental cosmetic effect.

Turning now to the figures and referring first to FIG. 1, a block diagram of a cosmetic applicator system, system 100, is illustrated in accordance with exemplary embodiments of the present invention. In exemplary embodiments, system 100 generally includes a cosmetic dental applicator, or applicator 101; a dispenser 102 affixed or removably coupled to applicator 101; a dispenser tip 103, that may be integral with or unitarily part of dispenser 102; a cosmetic composition 104 that is adapted to cosmetically treat a surface of a user's tooth; an optional and or alternative curing light module 105a; an optional and or alternative activating substance 105b; a protective shield 106; and an optional scrapper tool 107.

Figure 2:
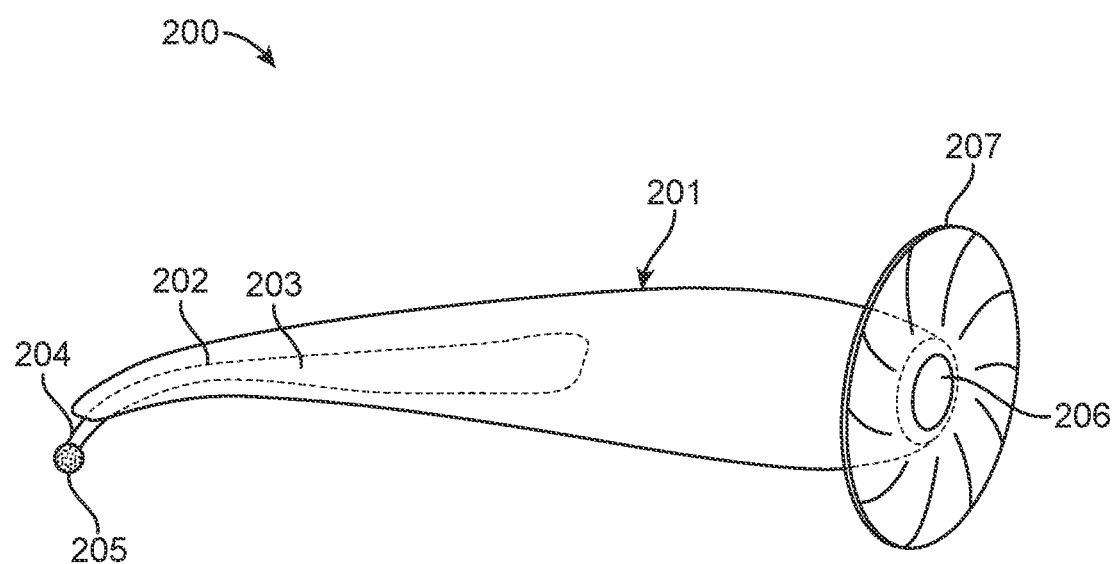
FIG. 2 illustrates a perspective view of a device in accordance with some exemplary embodiments of the present invention.

In some exemplary embodiments, system 100 comprises a comprehensive device that includes or incorporates each of the components of system 100 as shown in FIG. 1 (i.e., applicator 101, dispenser 102, tip 103, composite 104, curing light 105a, protective shield 106) into a single unit; for example, see one embodiment illustrated in FIG. 2. In some exemplary embodiments, system 100 comprises a simpler applicator 101, which may not include or incorporate all components of system 100 into a single unit; for example, see one embodiment illustrated in FIG. 3. In some exemplary embodiments, system 100 may comprise of a cosmetic treatment kit that includes each of the components of system 100 as shown in FIG. 1.

Generally, in exemplary embodiments, system 100 is designed to provide an easy and efficient way to apply a cosmetic composition on a treatment surface of a user's tooth, for example on one or more anterior upper teeth. Typically, although not necessarily, the users of system 100 may be direct consumers, rather than professionals.

Applicator 101 is generally a hand-held cosmetic composition application device configured to apply the dental cosmetic composition onto the surface of a tooth, or treatment surface 108. As will be discussed below with reference to other figures, applicator 101 may be comprehensive and incorporate curing light module 105a, or applicator 101 may be simplified and provided as a simple, manual applicator such as a syringe type of configuration that is used in tandem with a separate and distinct cuing light module 105a; in some embodiments, depending on the type of composition used, a curing light module may not be necessary at all. Applicator 101 is configured to hold a predetermined amount of a cosmetic treatment composition; this predetermined amount may be suitable for a single use, or for any number of uses without deviating from the scope of the present invention. For example, applicator 101 may be configured to hold a predetermined amount that is enough for multiple uses, but not so much so that the efficacy of the composition is affected over long periods of time. Applicator 101 generally includes an applicator component; the applicator component may be any type of manual or mechanical means of dispensing a portion of the composition stored within applicator 101 through a dispenser, such as dispenser 102 (discussed further below). For example, and without limiting the scope of the present invention, an applicator component may be any structure adapted to push, press, squeeze, or otherwise apply pressure to the composition stored inside applicator 101 in order to expel a portion of the composition out of a storage cavity of applicator 101. In some exemplary embodiments, this may be achieved with a flexible structure adapted to be squeezed. In some exemplary embodiments, a mechanical component such as a structural stop may be adapted to push the composition out of a cavity of applicator 101. In exemplary embodiments, applicator 101 may be pre-filled with the cosmetic dental composition, typically sealed to maintain composition's efficacy prior to use. In exemplary embodiments, a body of applicator 101 may be tubular and or elongated; for example, and without limiting the scope of the present invention, in the shape of a pen, or syringe, or generally an elongated housing that is generally easy to manipulate by user. In some exemplary embodiments, applicator 101 may be adapted to merely dispense composition 104 out of the applicator 101 and or apply a suitable portion of composition 104 onto treatment surface 108 of a user's tooth. In other exemplary embodiments, however, applicator 101 may be more complex and process or manipulate composition 104 in some manner suitable for application onto the treatment surface. For example, and without limiting the scope of the present invention, applicator 101 may be configured for printing a cosmetic composition onto the treatment surface 108. Accordingly, applicator 101 may be any suitable device adapted to house a cosmetic dental composition and configured for printing, depositing, delivering, or applying the composition 104 to the treatment surface 108.

Dispenser 102 may be an opening or outlet of applicator 101 that is adapted to dispense the cosmetic composition when applicator 101 is in use. In exemplary embodiments, dispenser 102 is situated at a terminal end of an elongated housing or body of applicator 101. Typically, dispenser 102 may be shaped to dispense the composition more easily, or to receive a dispensing tip that facilitates the disposing and or application of the composition onto a surface of a user's tooth. For example, and without limiting the scope of the present invention, dispenser 102 may include an exterior region that registers with a dispensing tip, such as a removable dispensing tip.

Tip 103 may be any type of dispensing tip that is suitable for both dispensing the dental cosmetic composition 104 and applying the dental cosmetic composition 104 onto a surface of a user's tooth, such as a treatment surface 107 depicted in FIG. 1. Accordingly, tip 103 may include components, either integral with tip 103 or removably coupled thereto, such as filaments, flexible surfaces, rollers, or any other structures suitable for facilitating disposing or application of the composition 104. For example, and without limiting the scope of the present invention, in one embodiment, tip 103 includes one or more filaments used for applying the composition 104 to the treatment surface 108. In one embodiment, tip 103 may include a roller that facilitates applying the composition 104 to the treatment surface 108. In one embodiment, tip 103 may include a nozzle used for applying the composition 104 to the treatment surface 108. In one embodiment, tip 103 may include a flexible flat surface adapted to disperse and apply the composition 104 on to the treatment surface 108. As may be appreciated by one of ordinary skill in the art, tip 103 may employ different dispenser tip structures in order to achieve the desired printing, depositing, delivering, or applying the composition 104 to the treatment surface 108.

Composition 104 is generally a dental cosmetic composition suitable for application and curing onto a surface of a user's tooth. Generally, composition 104 is suitable for fixing or addressing cosmetic problems. This means that cosmetic composition 104 is adapted to harden on the surface of a tooth, but also easily removed from the treatment surface. To achieve this, composition 104 may be desirably malleable when in an uncured state (i.e., inside applicator 101 and upon application onto the treatment surface 108) and adapted to harden or cure onto the treatment surface 108 after application. For example, and without limiting the scope of the present invention, in some exemplary embodiments composition 104 may comprise of a photosensitive composition that cures with a curing light source. In some exemplary embodiments, composition 104 cures chemically upon mixing with one or more activating substances that activate a curing reaction.

In some embodiments, composition 104 may include ingredients that enhance or protect the tooth structure. For example, and without limiting the scope of the present invention, composition 104 may include Fluoride to protect the tooth structure. In some embodiments, composition 104 may, optionally or alternatively, or additionally, include ingredients that improve or enhance the user's breath.

Without limiting the scope of the present invention, composition 104 may be adapted for treating a wide range of cosmetic issues, such as: treating a discolored tooth or discolored region of a tooth, improving a shape or contour of a deficient tooth, masking a crookedness of the tooth, treating a defective surface in size or contour of one or more teeth, enhancing of the size, length, or width of one or more teeth, or otherwise cosmetically treating a surface of a tooth to enhance the appearance or fix cosmetic problems associated with one or more of the user's teeth.

In some exemplary embodiments, composition 104 helps treat the treated surface upon being cured onto the treated surface. In some exemplary embodiments, composition 104 is adapted to be removably applied to the treatment surface and easily removed from the treatment surface 108. In one embodiment, composition 104 is durable enough for one or two days and is later removed by the user. In exemplary embodiments, application of composition 104 is a cosmetic fix and not a permanent fix for the treatment surface.

In some exemplary embodiments, for example wherein composition 104 comprises of a photosensitive composition, system 100 may optionally, additionally, or alternatively, include a light module 105a. The light module 105a is configured to radiate or illuminate a curing light onto some exemplary embodiments of composition 104 that has been applied to treatment surface 108. In one embodiment, the curing light may be an LED light. As will be discussed further below, in some exemplary embodiments, curing light module 105a may be coupled to or incorporated within a housing of applicator 101. In some exemplary embodiments, curing light module 105a may be a separate device, distinct from and housed separately from applicator 101. For example, a user may use applicator 101 to apply and mold or shape a portion of composition 104 onto treatment surface 108, and then use a separate stand-alone device, such as an LED lamp that incorporates curing light module 105a.

In some exemplary embodiments, for example wherein composition 104 comprises of components that may be activated or cured upon mixing with one or more activating substances, an activating substance 105b may be optionally, additionally, or alternatively provided with the kit or system 100.

In some embodiments, system 100 may include a protective shield 110 desirably positioned around the light module 105a; this configuration may be desirable in embodiment in which applicator 101 comprises of a more comprehensive device, which includes a curing light housed inside a housing of the applicator. Since exposing some embodiments of composition 104 may prematurely cure the composition, protective shield 106 may be desirably placed in a manner so that unintentional light exposure is avoided. In some exemplary embodiments, the light module may be situated or positioned at a terminal end of the applicator, for example, and without deviating from the scope of the present invention, the light module may be positioned in the front next to the dispenser. In some exemplary embodiments, the light module may be positioned on a posterior end or at the back end of the device, requiring the user to turn the body prior to curing by activating the curing light module.

Referring now to the next figure, FIG. 2 illustrates a perspective view of a device in accordance with some exemplary embodiments of the present invention. More specifically, FIG. 2 illustrates applicator 200, which is a device that incorporates each of the elements discussed with reference to exemplary system 100 as illustrated in FIG. 1. In exemplary embodiments, as shown in FIG. 2, applicator 200 is adapted to hold a photosensitive composition and includes within its housing a curing light at a terminal end of the device.

Applicator 200 may comprise an elongated body or housing 201. The elongated housing 201 comprises a cavity 202 configured to hold a dental cosmetic composition 203. In some exemplary embodiments, applicator 200 may be configured to receive interchangeable cartridges that register with or may be placed inside cavity 202, the cartridges adapted to be loaded and unloaded as needed; for example, and without limiting the scope of the present invention, removable cartridges may contain one or more variations of or types of compositions for dispensing through applicator 200. In exemplary embodiments, applicator 200 further comprises a dispenser 204. In one embodiment, the dispenser 204 is located at any one end of the elongated housing 201 and configured to dispense an uncured composition 203 on a treatable surface of a user's tooth, for example treatment surface 108. In one embodiment, dispenser 204 comprises a tip 205 configured to dispose the composition 203 onto the treatment surface. As mentioned above, tip 205 may include a wide range of structural components in order to facilitate application of composition 203 onto the treated surface.

Applicator 200 further comprises a light module 206 configured to illuminate/radiate a curing light. In one embodiment, the light module 206 is attached at another end of the elongated housing 201 that is opposite of the disposing end at which the dispenser 204 and tip 205 may be situated. This arrangement enables the user to point the curing light onto the composition after application. In some exemplary embodiments, the light module 206 may be positioned on the same side of the dispensing tip and may be activated by the user with a button. In some exemplary embodiments, the light module 206 may be positioned on a dispensing tip of the device and may be intermittently turned on and off as the composition is being deposited or printed onto a region of a tooth in order to facilitate the curing process. In the shown embodiment of FIG. 2, a user may first apply the composition onto a surface of a tooth, then turn applicator around and activate light module 206 to cure the applied composition onto the surface of the tooth.

Applicator 200 further comprises a protective shield 207. In one embodiment, the protective shield 207 is provided around the light module 206. In one embodiment, the protective shield 207 is used to ensure that the composition 203 remains uncured within applicator 200. In one embodiment, the protective shield 207 is further used to protect the user's eyes from the curing light while using applicator 200.

Accordingly, in exemplary embodiments of the present invention, a device for applying uncured composition on a treatment surface, comprises an elongated body having a cavity configured to hold the uncured composition; a dispenser located at one end of the elongated body configured to dispense the uncured composition on the treatment surface, and a light module located on the elongated body configured to illuminate a curing light onto the uncured composition, thereby hardening the composition onto the treatment surface to fix cosmetic problems associated with a user.

In some exemplary embodiments, the device is a hand-held photosensitive composite applicator device. In some exemplary embodiments, the device is a cosmetic applicator configured to apply the composition on at least one tooth to fix a chipped edge on the tooth or chipped tooth. In some exemplary embodiments, the device is a hand-held composite device used for printing, depositing, delivering, or applying a composition to treat a discolored tooth or discolored region of a tooth. In some exemplary embodiments, the device is a hand-held composite device used for printing, depositing, delivering, or applying a composition to improve a shape and contour of a deficient tooth. In some exemplary embodiments, the device is a hand-held composite device used for printing, depositing, delivering, or applying a composition to treat mask a crookedness of the tooth.

In some exemplary embodiments, the device includes a dispenser that comprises a tip or an outlet nozzle located on a front end of the device configured to print the composition on the treatment surface. In some exemplary embodiments, the dispenser comprises one or more filaments configured to apply the composition on the treatment surface.

In some exemplary embodiments, a user may appropriately point the curing light over the composition to harden onto the treatment surface.

In some exemplary embodiments, the device further comprises a protective shield configured to mount around the light module. In some exemplary embodiments, the protective shield is configured to keep the composition uncured within the device. In some exemplary embodiments, the protective shield is configured to provide shielding to the user from the curing light while using the device. In some exemplary embodiments, the curing light is LED light.

Figure 3:
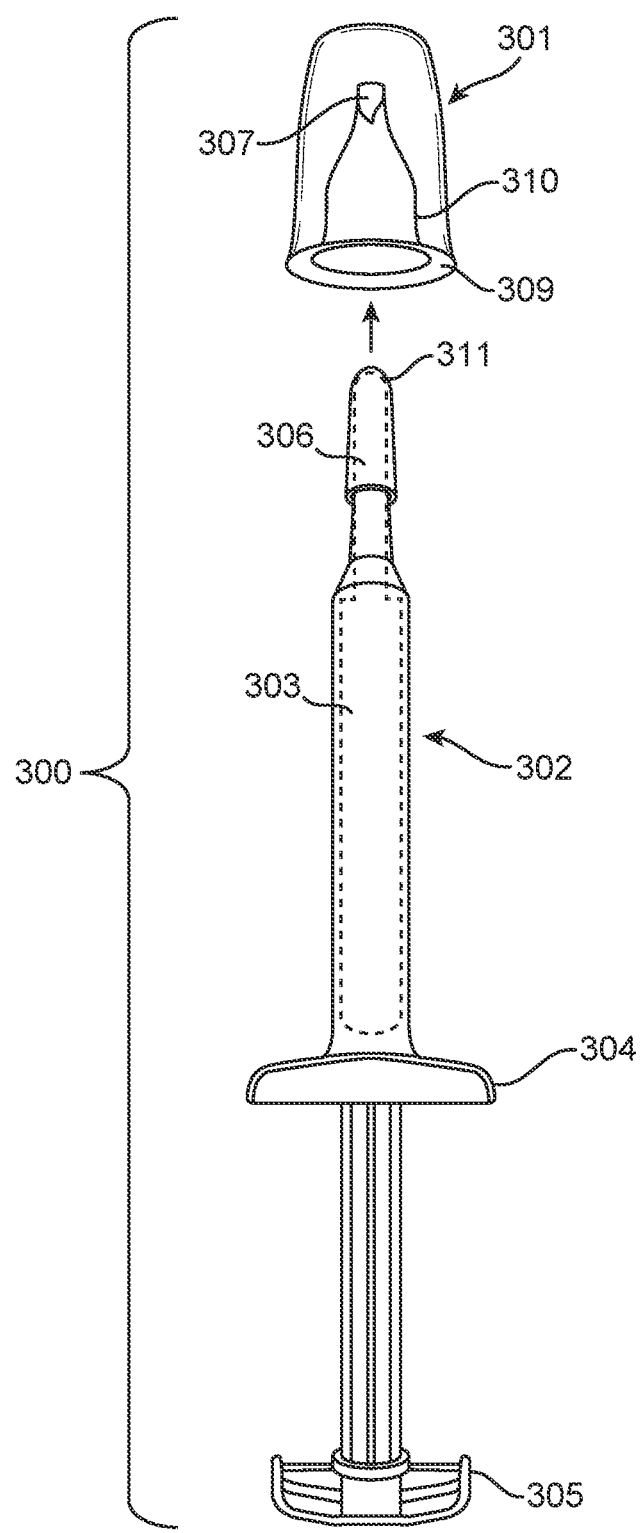
FIG. 3 illustrates a semi-exploded view of a device in accordance with some exemplary embodiments of the present invention.

Turning now to the next figure, FIG. 3 illustrates a semi-exploded view of a device in accordance with some exemplary embodiments of the present invention. More specifically, FIG. 3 illustrates applicator 300, comprising of an applicator tip 301, a syringe type applicator body 302. Applicator tip 301 is adapted to fit on a terminal end of applicator body 302, which includes a cavity 303 that holds a dental cosmetic composition. A user may simply apply pressure on finger flange 304 and plunger 305 of the applicator body 302 to expel the dental cosmetic composition through a tubular member that houses the cavity 303 via a flow path 306, exiting at an opening 307 of applicator tip 301.

Applicator tip 301 is configured to dispense and distribute or apply a portion of the dental cosmetic composition from the applicator body 302 onto a surface of a tooth cosmetically treated in accordance with practice of the present invention. In exemplary embodiments, applicator tip 301 is silicone-based material, and is flexible—at least at its terminal that includes a flexible region 308 with a flat surface 312 (see FIG. 4 and FIG. 5, for example) encompassing opening 307 therein; this configuration is desirable to facilitate spreading and or molding the dental cosmetic composition onto the surface of the cosmetically treated tooth.

To removably couple with applicator body 302, applicator tip 301 includes a base 309 and a tubular member extending from base 309 to opening 307 to define a flow tube 310 that snuggly fits around a tip region 311 of applicator body 302. In some exemplary embodiments, at least a portion of the flow tube 310, which is distal from the base 309, tapers towards the opening 307. In exemplary embodiments, an outer member extends from the base and at least partially surrounds the tubular member.

Depending on the type of composition that makes up the dental cosmetic composition housed inside applicator 300 (i.e., in embodiments in which applicator 300 dispenses a photosensitive dental cosmetic composition), a separate curing light unit may be provided. The user would apply a desired position of the dental cosmetic composition onto their tooth using applicator 300, and then use a separately provided curing light unit or lamp, to cure the photosensitive composition onto the treatment surface of the tooth cosmetically treated.

Figure 4:
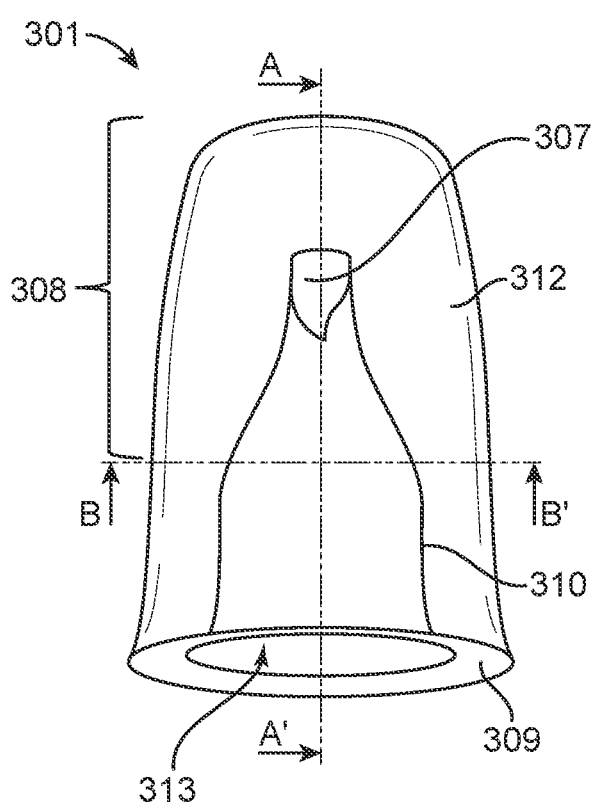
FIG. 4 illustrates an applicator or device tip in accordance with some exemplary embodiments of the present invention.
Figure 5:
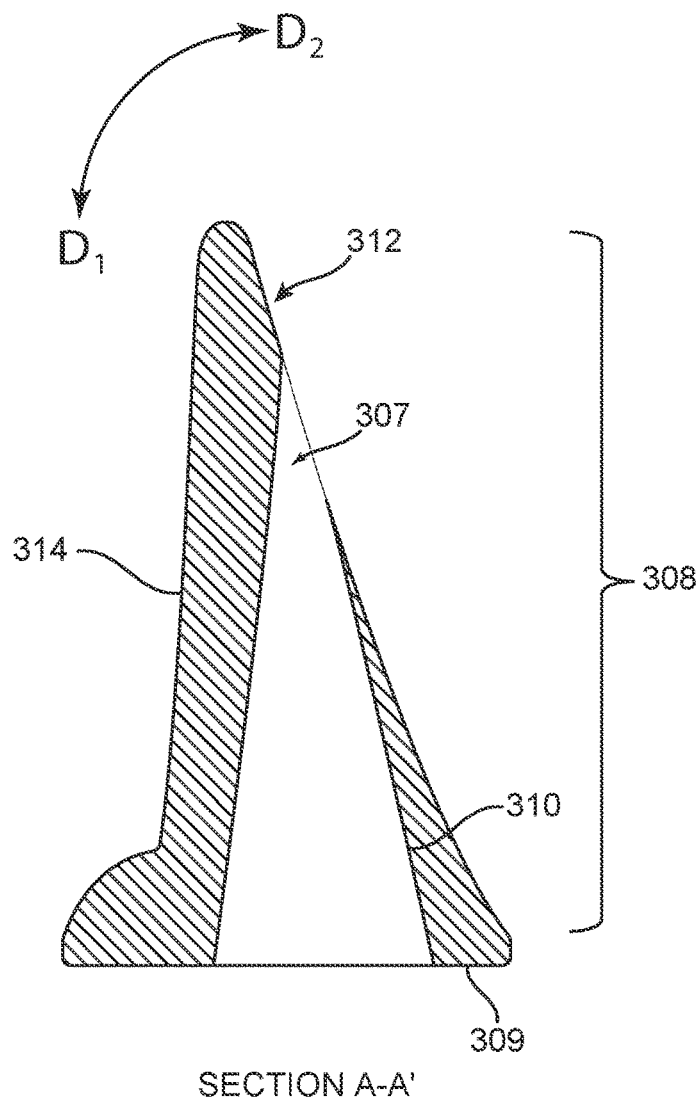
FIG. 5 illustrates a cross-sectional view of the device illustrated in FIG. 4 in accordance with some exemplary embodiments of the present invention; the cross-section along a length of the device illustrated in FIG. 4.
Figure 6:
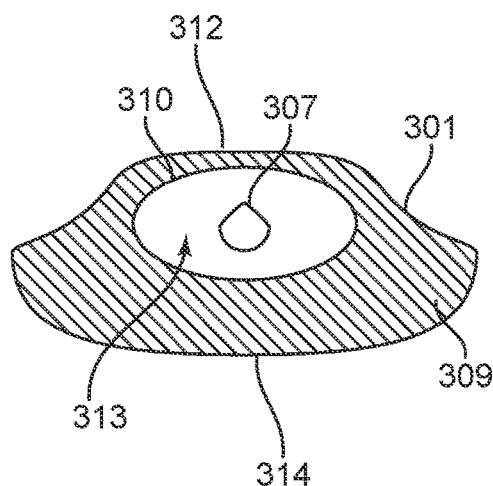
FIG. 6 illustrates a cross-sectional view of the device illustrated in FIG. 4 in accordance with some exemplary embodiments of the present invention; the cross-section along a width of the device illustrated in FIG. 4.
Figure 7:
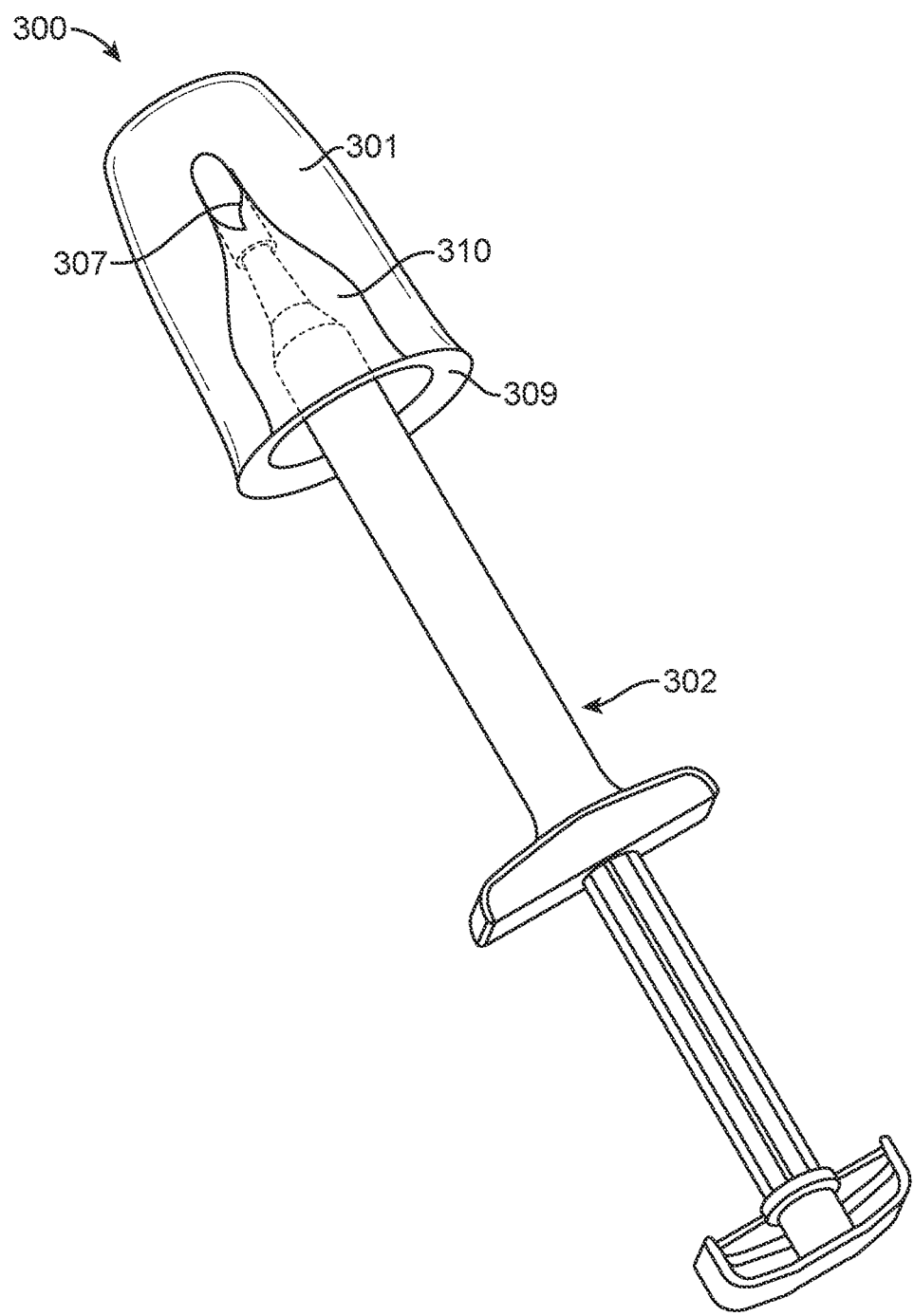
FIG. 7 illustrates a perspective view of the tip coupled to the syringe type applicator device, in accordance with some exemplary embodiments of the present invention.

FIG. 4 is a close-up view of applicator tip 301. Furthermore, to give more clarity on the configuration and design of some exemplary embodiment of applicator tip 301, FIG. 5 and FIG. 6 illustrate cross-sectional views along a length (i.e., line A-A) of the device and along a width (i.e., line B-B) of the device, respectively. FIG. 7 illustrates a perspective view of applicator 300, with applicator tip 301 coupled to applicator body 302, in accordance with exemplary embodiments of the present invention.

Turning first to FIG. 4, applicator tip 301 is shown with a flexible region 308 that includes therein a flat surface 312. Within this flat surface 312 is disposed opening 307, which functions as the outlet of applicator tip 301. Inlet 313 is defined in part by base 309 and flow tube 310, which receives tip region of applicator body 302 and facilitates a flow of the dental cosmetic composition through applicator tip 301.

FIG. 5, a cross-sectional view of tip 301 along longitudinal line A-A, illustrates flat surface 312 within the flexible region 308 of the applicator tip 301. Flat surface 312 may be desirably flexible so that this portion of applicator tip 310 bends upwards or in direction $D_1$ (more so than direction $D_2$) in order to facilitate a molding stroke for the user applying the dental cosmetic composition onto the treated tooth surface; when or as a desirable portion of the dental cosmetic composition is dispensed through opening 307, flat surface 312 of the flexible region may be used to spread, for example, the desired amount of composition onto the treated surface of the tooth.

FIG. 6, a cross-sectional view along a width or line B-B of applicator tip 301, depicts a relative thickness between the side including flat surface 312 and the side including top surface 314. FIG. 7 illustrates a perspective view of applicator 300 depicted with applicator tip 301 coupled to the syringe type applicator body 302.

Figure 8:
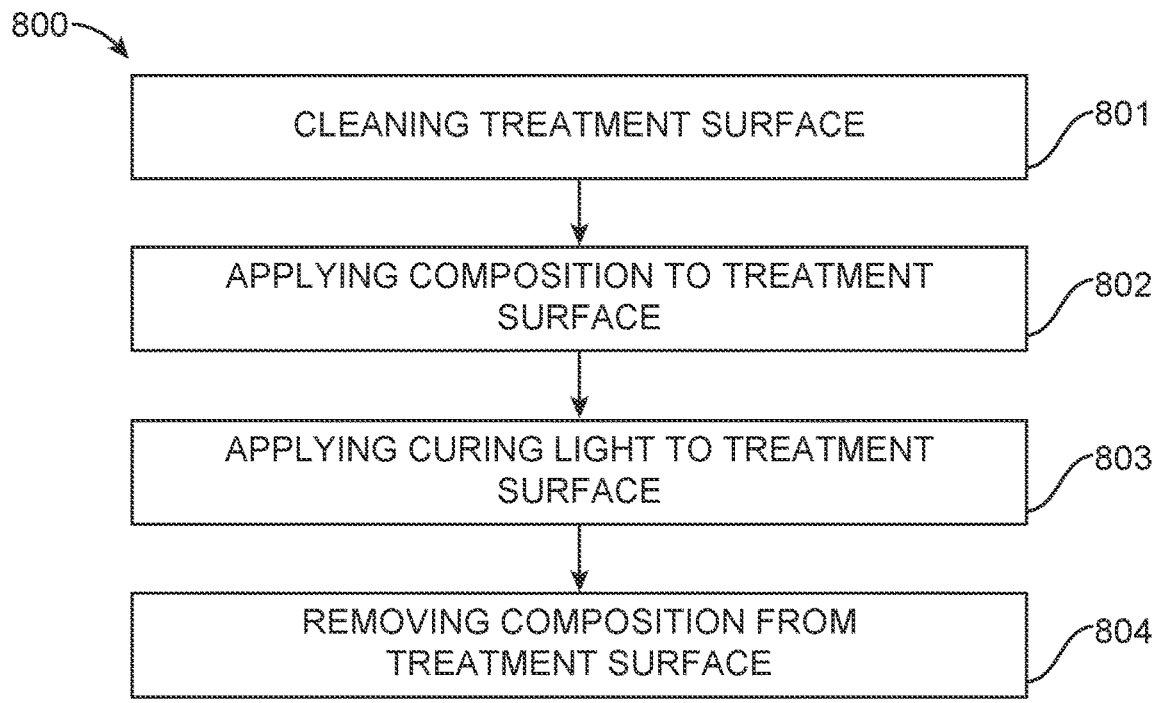
FIG. 8 illustrates a flow chart of a method for applying a composition on a treatment surface, in accordance with practice of some exemplary embodiments of the present invention.

Turning now to FIG. 8, a flow chart depicting method 800 for applying a composition 104 on a treatment surface 108 using a system 100 is illustrated. In one embodiment, the method comprises the following steps. It is understood that although method 800 is shown in a particular sequence or ordered steps in accordance with some exemplary embodiments of the present invention, other sequences with additional or fewer steps may be practiced without deviating from the scope of the present invention.

At step 801, a user or consumer initially cleans the treatment surface 108, for example, a tooth, and dehydrates the treatment surface 108 before applying the composition 104. In one embodiment, the treatment surface 108 is dehydrated using alcohol. At step 802, the composition 104 is applied to the treatment surface 108 using system 100. At step 803, the treatment surface 108 is treated with a curing light to harden the composition that is applied to the treatment surface 108. At step 804, the hardened composition 104 is removed from the treatment surface 108 after a certain period of time upon curing the treatment surface 108. In one embodiment, the composition 104 is a durable removable material. The method 800 described above with respect to system 100 may also be applicable to the applicator 300. In one embodiment, the hardened composition 104 is removed with a tool provided to the user to scrape the composition and separate it from the treated tooth. In some exemplary embodiments, the user may be provided with instructions to use a scrapper tool or to use their fingernail to remove the composition from the tooth.

In one embodiment, the user applies the composition 104 on at least one tooth to fix the chipped edge on the tooth or chipped tooth. In one embodiment, the user selects the most appropriate color using a color guide to match the tooth color before applying the composition 104. In one embodiment, the user applies one or more layers of composition 104 to the treatment surface 108. In one embodiment, each layer of composition 104 applied by the user is cured using the curing light. In one embodiment, the one or more layers include a first layer, one or more intermediate layers, and a last layer or gloss layer. In one embodiment, the user may preferably or additionally the gloss layer on top of the cured layers and cures the gloss layer after some time using the curing light.

In exemplary embodiments of the present invention, a method performed by a consumer for applying a composition on a treatment surface of a tooth using a cosmetic applicator, comprises the steps of: cleaning and dehydrating the treatment surface; printing onto the treatment surface the composition; treating the treatment surface with a curing light to harden the composition on the treatment surface, and removing the hardened composition from the treatment surface after a certain period. In some exemplary embodiments, printing onto the treatment surface the composition includes printing the composition on at least one chipped edge on the tooth. In some exemplary embodiments, printing onto the treatment surface the composition, includes printing the composition on at least one chipped tooth.

In exemplary embodiments, treating the treatment surface may include treating a discoloration of one or more teeth, masking a crookedness of one or more teeth, treating a defective surface in size or contour of one or more teeth, enhancing of the size, length, or width of one or more teeth. As may be appreciated by a person of ordinary skill in the art, a user can, without the need of professional treatment, treat a surface of a tooth to enhance the appearance or fix cosmetic problems associated with one or more of the user's teeth.

In some exemplary embodiments, the method further comprises the step of selecting, from a color guide provided to the user, a color to match with the tooth color before applying the composition. In some exemplary embodiments, the treatment surface is dehydrated using alcohol. In some exemplary embodiments, the user applies one or more layers of composition on the treatment surface.

In some exemplary embodiments, each layer of composition is cured using a curing light from the light module. In some exemplary embodiments, the user appropriately points the curing light over the applied composition to harden onto the treatment surface. In some exemplary embodiments, the composition is a durable removable material. In some exemplary embodiments, the composition is removed using a tool provided to the user to scrape the composition and separate it from the treated tooth. In some embodiments, the user is instructed to use their fingernail to remove the composition from the tooth.

Figure 9:
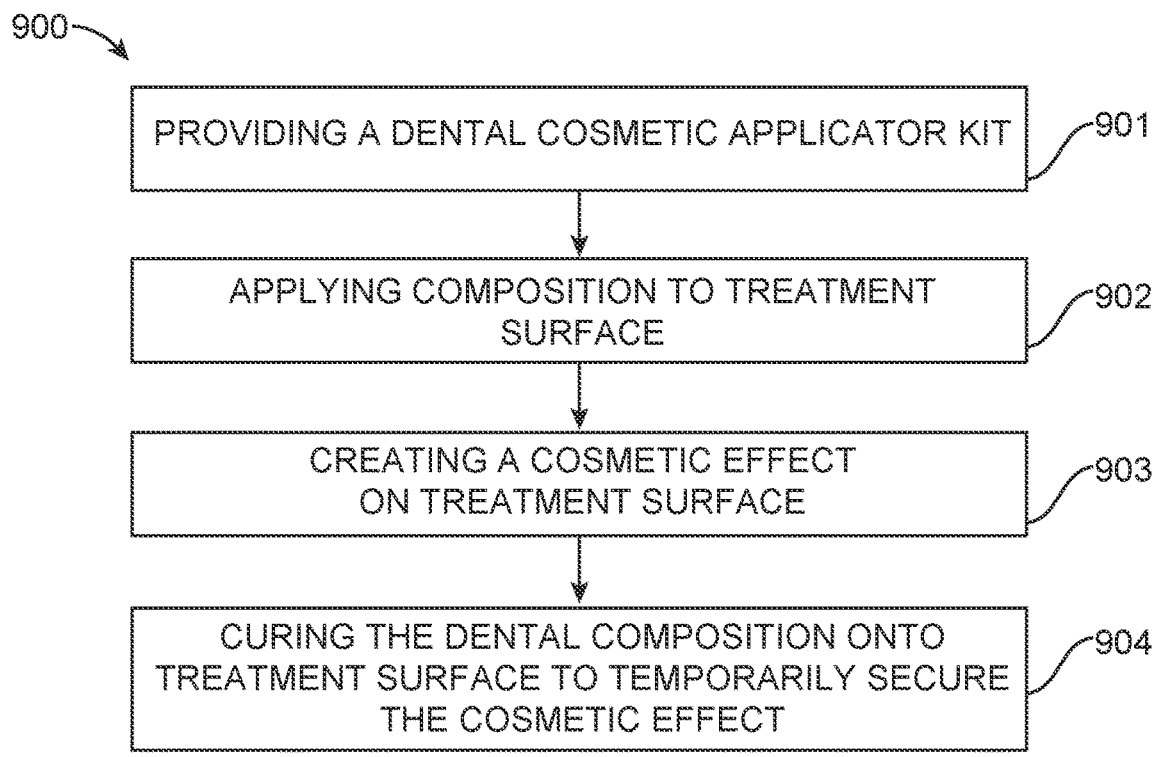
FIG. 9 illustrates a flow chart of a method for creating a cosmetic effect on a treatment surface of a tooth, in accordance with practice of some exemplary embodiments of the present invention.

Turning now to the next figure, FIG. 9 illustrates a flow chart depicting method 900, generally performed by a direct consumer rather than a trained professional, for creating a cosmetic effect on a treatment surface of a tooth. For example, and in no way limiting the scope of the present invention, a consumer may be provided with a system or kit such as system 100 in accordance with the present invention, along with instructions to use the provided system 100 to create a desired cosmetic effect that is temporary, not-damaging to the tooth and affordable for all consumers.

At step 901, a kit may be provided comprising multiple (although not necessarily all) components of system 100. For example, in exemplary embodiments, providing system 100 may include providing a dental cosmetic applicator 101 with an applicator tip 103, and a dental cosmetic composition 104 sealed inside the dental cosmetic applicator 101, wherein the dental cosmetic composition 104 is durably removable. Instructions may be provided along with the kit or system 100. The instructions may provide the direct consumer or user with the following steps discussed in turn.

At step 902, a portion of the dental cosmetic composition may be applied—using the applicator, onto the treatment surface. In exemplary embodiments, this may include applying a force on the dental cosmetic applicator 101 in order to dispose the desired portion onto the target tooth surface. Depending on the device used, this may be achieved either automatically, or with simple manual pressure from the user/direct consumer.

At step 902, using the applicator tip 103, the user may mold the portion of the dental cosmetic composition 104 to create a cosmetic effect on the treatment surface 108 of the tooth. In some exemplary embodiments, creating the cosmetic effect on the treatment surface 108 includes one of the following: masking a surface defective in size of one or more teeth; masking a surface defective in contour of one or more teeth; enhancing a size, a length, or a width of one or more teeth; or treating a discoloration of the treatment surface 108.

At step 903, the dental cosmetic composition is cured onto the treatment surface 108. In some exemplary embodiments, curing the dental cosmetic composition includes either: treating the treatment surface 108 with a curing light 105a to cure the dental cosmetic composition onto the treatment surface, or mixing one or more activating substances 105b with the dental cosmetic composition 104 to cure the dental cosmetic composition 104 onto the treatment surface 108.

As with method 800, a user or consumer may initially clean the treatment surface 108, which may include cleaning and or dehydrating the treatment surface 108 before applying the composition 104.

In some exemplary embodiments, the method may further comprise of selecting, from a color guide provided to the consumer, a color to match with a tooth color of the treatment surface of the tooth before applying the dental cosmetic composition.

Upon completed use, at step 904, the user may remove the cured dental cosmetic composition from the surface of their tooth, for example, simply by removing the cured dental cosmetic composition from the treatment surface using a scrapper tool or a fingernail.

Advantageously, the device of the present invention is a hand-held cosmetic applicator. The device provides an easy and efficient way of applying composition to the treatment surface. The device applies the composition onto a treatment surface to fix cosmetic problems. The device applies the composition on at least one tooth to fix cosmetic problems such as a chipped edge on a tooth or chipped tooth. Further, the device allows the select the more appropriate color of the photosensitive material to match with the treatment surface, for example, a tooth, before applying the composition.

Figure 10:
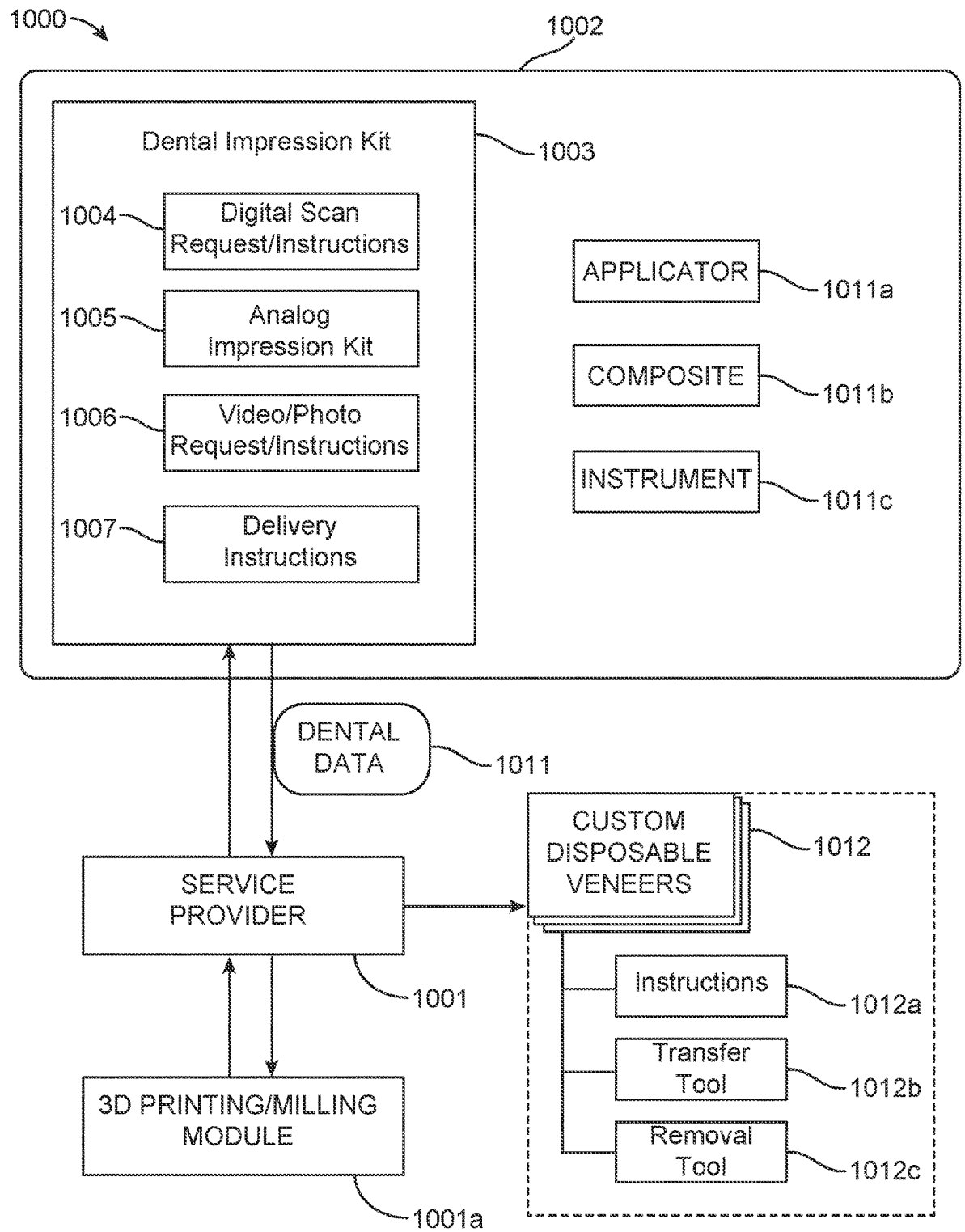
FIG. 10 illustrates a block diagram of a system and method in accordance with the present invention.

Referring to FIG. 10, a system and method are illustrated by way of a block diagram. More specifically, FIG. 10 depicts system 1000, which includes a services provider 1001, having access to a 3D printing or milling module (module 1001a), and a dental cosmetic kit 1002, which may be prepared and distributed by service provider 1001 to consumers, enabling consumers to create a temporary dental cosmetic effect in accordance with the present invention.

In exemplary embodiments, service provider 1001 is capable of sending certain instructions (discussed below) and receiving dental data from a consumer or user of system 1000, in order to build or create disposable veneers based on the consumer's dental and facial data. The custom-made disposable veneers may be distributed to the consumers along with the set of instructions.

The dental cosmetic kit 1002 may include any of the devices and components discussed above in addition to the specific components discussed in turn, without deviating from the scope of the present invention. Alternatively, optionally, or in addition to, kit 1002 may be provided to a consumer with a dental impression kit 1003, applicator 1011a, composite 1011b, and instrument 1011c. Kit 1003 is designed to guide a user desiring a cosmetic effect such as an improved smile, as a temporary solution in lieu of a more permanent solution requiring expensive professional treatment. For example, a user desiring to temporarily mask, enhance, or alter a surface of one or more teeth, may be provided with a set of one or more disposable veneers. To facilitate this goal, kit 1003 may include detailed instructions for the consumer or user to receive the same.

In exemplary embodiments, kit 1003 includes instructions for the user to provide service provider 1001 with dental data associated with the user. For example, dental data may include a dental scan of the user, or an analog dental impression of the user, without limiting the scope of the present invention. To these ends, in exemplary embodiments, kit 1003 includes digital scan instructions 1004, and or analog impression kit 1005, and or instructions 1006 to provide images of the user, such as video or sequential photographs of the user's mouth. Finally, kit 1003 may include delivery instructions 1007 instructing the user on how to provide the requested dental data and or how to receive the anticipated custom disposable veneers from service provider 1001.

Accordingly, system 1000 is configured to provide custom durably removable veneers that consumers apply temporarily to mask the imperfection of shapes, designs, stain, structure, position, display and color of their teeth; or as an artistic enhancement of their dental anatomy to temporarily replicate a different smile or tooth display.

Generally, an overall method in accordance with system 1000 is as follows: consumers request the solution from service provider 1001; service provider 1001 sends kit 1002, which may include for example an analog dental impression kit 1005 to the user, or instructions 1004 for the user to provide a digital scan of their teeth if they have access to it from their dentist, or may be able to obtain one on their own.

Service provider 1001 may also preferably include instructions 1006 regarding obtaining images of the user; as such, the user may also preferably provide a series of photos (or short video) of their facial features including a smile and a smile with an open mouth. Service provider 1001 may also include instructions regarding additional dental data, such as a survey for the user to fill out. In exemplary embodiments, the user completes the survey. In exemplary embodiments, the survey requires the user to describe their primary reason to seek custom removable veneers.

The user may be instructed to provide the dental data, including any dental scans or a physical dental impression to service provider 1001. The user may for example ship the analog impression to the provider or electronically send the digital scan to service provider 1001.

Upon receipt of the information requested via kit 1002, service provider 1001 may scan and or process the analog impression or the digital impression. In exemplary embodiments, as mentioned above, service provider 1001 has access to a 3D printing or milling module 1001a to create the disposable veneers. The custom veneers may be digitally designed by service provider 1001 based on the dental data of the user so that the disposable veneers are custom made for the user.

Custom disposable veneers 1012 are thus fabricated using 3D printing or milling module 1001a, based on the user's dental data, typically post processed and finished, layered, stained and glazed. Custom disposable veneers 1012 may be packaged and shipped to the consumer—one or more than one set.

The consumer applies the veneers one by one on each tooth, by using a temporary bonding solution that may bond or cure to the user's teeth by, for example (but without limitation) heat curing, light curing, or activation by another agent. In some embodiments, a double-sided tape may be employed as well. The bond strength of the temporary bonding solution is preferably stronger between the veneer and the bonding material, than between the bonding material and the tooth surface. In exemplary embodiments, the temporary bonding solution for applying the disposable veneers is the same or similar to the composition that the user may apply to a tooth in order to mold, smear, or contour to create the cosmetic effect on the tooth; that is the same composition may be suitable for both dental cosmetic applications.

In accordance with the present invention, custom disposable veneers 1012 are disposable and temporary. These veneers should allow smiling, social interaction, kissing and chewing soft food. After a certain amount of time (12 hours to 48 hours, for instance), the consumer removes the veneer by peeling the veneer of the tooth surface. The composition and/or bonding agent should be adapted to attach to a surface of the disposable veneer a lot stronger than to the enamel of the consumer's tooth. The composition and/or bonding agent also should be nondestructive to the surface of the enamel. Examples of the composition and/or bonding agent may include light and chemically curing methacrylate based filled and unfilled composites and polymers.

In practice of exemplary embodiments, a method performed by service provider 1001 may include a method for enabling a consumer to create a dental cosmetic effect. The method may include: providing to a user a dental cosmetic application kit 1002 including a first set of instructions (e.g., 1004, 1005, or, 1006) for receiving one or more disposable veneers 1012 adapted to removably adhere to a surface of a tooth with a durably removable composition having a stronger adhesion to a surface of a disposable veneer than to the surface of the tooth; requesting or receiving by the service provider 1001, from the user, dental data 1011 associated with the user including an analog dental impression or a dental scan of the user; creating, by the service provider 1001 (for example, without limitation using module 1001a) the one or more disposable veneers 1012 based on the dental data 1011; providing, by service provider 1001, the user with the one or more disposable veneers 1012; and providing the user with a second set of instructions 1202a adapted to guide the user to: apply onto a surface of a tooth of the user or a surface of a disposable veneer a portion of the durably removable composition; and adhere the disposable veneer to the tooth, wherein a remainder of the one or more disposable veneers are optionally adhered to the dental arch of the user, one veneer to one tooth, to create the dental cosmetic effect.

As mentioned above, other components may be provided to the user without deviating from the scope of the present invention. For example, a toolkit can be delivered with the set of veneers comprising of a non-customized transfer tool 1012b for veneer application. The tools may include a removal tool 1012c such as a hook device for veneer removal and or an instrument to mold, smear and contour dental makeup composition. Moreover, a dental makeup composition 1011b (as discussed above an also with reference to prior figures) may be provided to the user to be used as temporary adhesive, to fill gaps and to ensure a natural appearance of the smile enhancement.

As shown, the tool kit or tools may be provided after or along with the custom disposable veneers 1012, or may be provided with an initial kit, such as kit 1002 which is illustrated to include applicator 1011a, dental makeup composition 1011b and instrument 1011c.

Notably, system 1000 may be utilized to provide consumer users with the applicator discussed with references to prior figures along with instructions of using the same, in conjunction with, but also as an alternative to, the option of providing custom disposable veneers 1012.

For example, and without limiting the scope of the present invention, s system 1000 may be adapted to provide the user with an applicator and applicator kit, including instructions for the user to follow. In exemplary embodiments, this method may include providing a user with a dental cosmetic application kit 100 including: a dental cosmetic applicator 101, an applicator tip 103, and a durably removable composition 104 adapted to adhere and harden onto a surface of a tooth.

Service provider 1001 may preferably provide (for example within the kit 100) the user with instructions for creating the dental cosmetic effect, wherein the instructions are adapted to guide the user to: apply onto a surface of a tooth of the user a portion of the durably removable composition 104; use the applicator 101 to mold, smear, or contour the portion of the durably removable composition 104 using the applicator tip 103 to create the cosmetic effect on the tooth; and remove the durably removable composition 104 from the surface of the tooth upon expiration of a predetermined range of time, using a scrapper tool 107 or fingernail of the user.

In embodiments in which both applicator and dental impression kit are provided, a user may optionally apply one or the other, or both during a single self-treatment. For example, a user may apply four of a set of disposable veneers along with fixing another tooth that may aesthetically benefit from enhancement with the applicator and composition that does not involve use of a disposable veneer.

In essence, system 1000 is designed for service provider 1000 to provide users with a do-it-yourself dental cosmetic system and method, enabling users to create a temporary dental cosmetic effect that obviates having to go to a professional, when only temporary cosmetic solutions are desirable.

Figure 11:
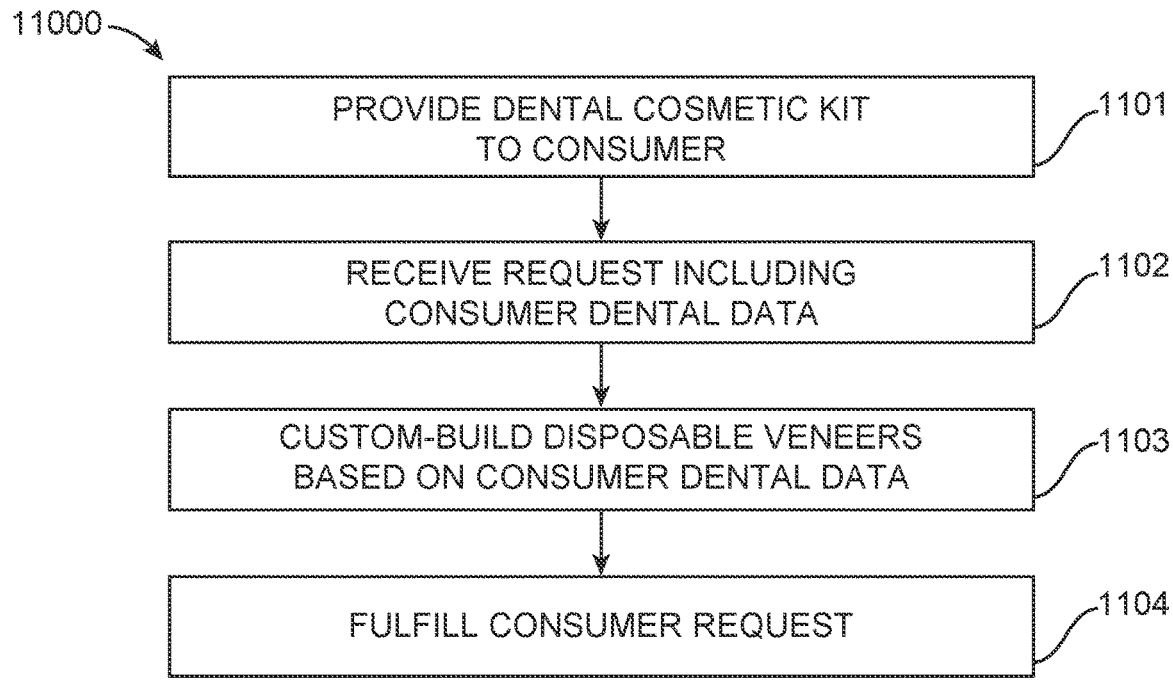
FIG. 11 illustrates a flow chart of a method, performed by a service provider, in accordance with exemplary embodiments of the present invention.

Turing now to the next figure, FIG. 11 depicts a flow chart of method 1100. Method 1100 is one method of providing disposable veneers. Method 1100 may be performed in the shown sequence or in alternative sequence, or with additional or less steps, without deviating from the scope of the present invention.

At step 1101 a service provider may provide a cosmetic kit to a consumer. This may involve, as mentioned above, providing a kit including instructions for dental data, which may be in the form of analog or digital representations of the consumer's dental arch or teeth. Additionally, this may include information associated with the consumer such as images or video of the user and or of the desired smile of the user. In step 1102, the service provider receives the requested dental data from the consumer. In step 1103, the service provider creates the disposable veneers based on the dental data associated with the consumer. In step 1104, the consumer request is fulfilled, and the disposable veneers are provided to the consumer.

Figure 12A:
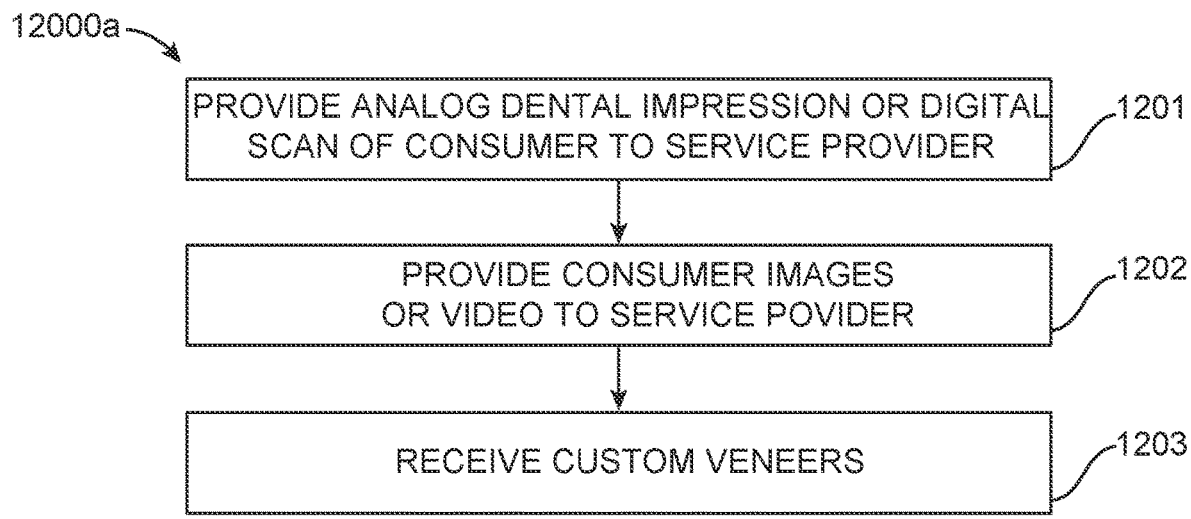
FIG. 12A illustrates a flow chart of a method, performed by a consumer or user, in accordance with exemplary embodiments of the present invention.

Turing now to the next figure, FIG. 12A depicts a flow chart of method 1200a. Method 1200a is one method for a consumer to request and receive disposable veneers in accordance with the present invention. Method 1200 may be performed in the shown sequence or in alternative sequence, or with additional or less steps, without deviating from the scope of the present invention.

At step 1201 a consumer provides dental data to a service provider. The dental data may include analog or digital representations of the consumer's dental arch or teeth. Additionally, this may include information associated with the consumer such as images or video of the user and or of the desired smile of the user, which may be provided in step 1202. In step 1203, the consumer simply receives the disposable veneers based on the dental data associated with the consumer, which was provided to the service provider in step 1201.

Figure 12B:
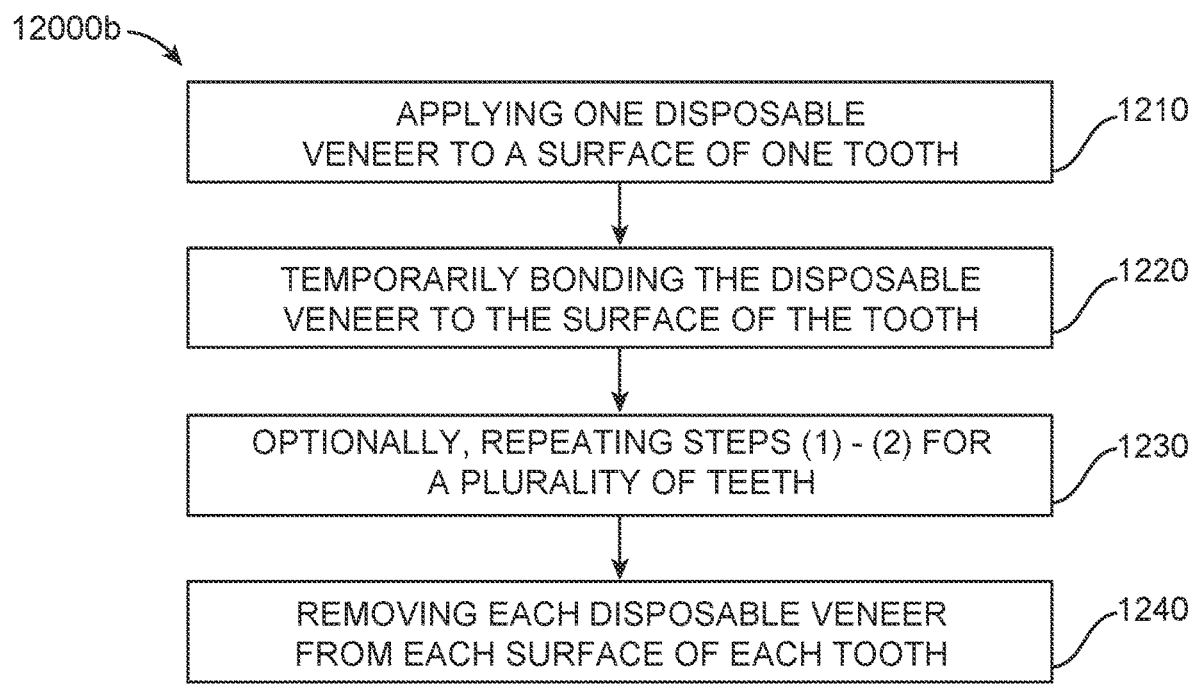
FIG. 12B illustrates a flow chart of a method, performed by a consumer or user, in accordance with exemplary embodiments of the present invention.

Turning now to the last figure, FIG. 12B depicts a flow chart of method 1200b. Method 1200b is one method for a consumer apply disposable veneers in accordance with the present invention. Method 1200b may be performed in the shown sequence or in alternative sequence, or with additional or less steps, without deviating from the scope of the present invention.

At step 1210 a consumer, having already provided dental data to a service provider and received disposable veneers in return, begins to use the kit. In this first step, the consumer may apply onto a surface of a tooth, or a surface of a disposable veneer provided, a portion of a durably removable composition included in the kit.

In step 1220, the consumer may adhere the disposable veneer to the tooth. In exemplary embodiments, the durably removable composition has a stronger adhesion to a surface of the disposable veneer than to the surface of the tooth.

In step 1230, the user may optionally utilize a remainder of the one or more disposable veneers that were provided, and may optionally adhered to the dental arch of the user, one veneer to one tooth, additional veneers to create the dental cosmetic effect desired by the user.

In step 1240, after limited use (e.g., hours rather than days), the user removes the composition from the tooth surface. In some embodiments, a predetermined amount of time may be a window of 12 to 49 hours after which the consumer should remove the veneers by peeling the veneer off the tooth surface.

Single-use or multi-use removable veneers in accordance with the present invention may be especially custom designed dental cosmetic appliances that users can wear on a temporary basis over their teeth, offering them the flexibility to put them on and take them off as needed. Each of these temporary veneers may be meticulously crafted to match the consumer's unique dental structure and consumer face and smile, ensuring a natural and comfortable fit. Furthermore, they may be provided in an array of shapes, shades, colors and designs, allowing individuals to choose according to their aesthetic preferences. Some users may even go a step further, replicating the teeth of renowned celebrities or personalities, allowing users to sport a famous smile for special occasions or simply for fun.

The disclosed invention is designed to be a temporary cosmetic solution. The invention is custom designed and made durable removable veneers that consumers apply temporarily to mask the imperfection of shapes, designs, stain, structure, position, display and color of their teeth; or as an artistic enhancement of their dental anatomy to temporarily replicate a different smile or tooth display.

While the disclosure has been described with reference to exemplary embodiments, it will be understood by those skilled in the art that various changes may be made, and equivalents may be substituted for elements thereof without departing from the scope of the disclosure. In addition, many modifications may be made to adapt a particular system, device, or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A method for creating a dental cosmetic effect, comprising the steps of:
   providing to a user a dental cosmetic application kit including a first set of instructions for receiving one or more disposable veneers adapted to removably adhere to a surface of a tooth with a durably removable composition having a stronger adhesion to a surface of a disposable veneer than to the surface of the tooth;
   requesting or receiving, from the user, dental data associated with the user including an analog dental impression or a dental scan of the user;
   creating the one or more disposable veneers based on the dental data;
   providing the user with the one or more disposable veneers; and
   providing the user with a second set of instructions adapted to guide the user to:
      apply onto a surface of a tooth of the user or a surface of a disposable veneer a portion of the durably removable composition; and
      adhere the disposable veneer to the tooth, wherein a remainder of the one or more disposable veneers are optionally adhered to the dental arch of the user, one veneer to one tooth, to create the dental cosmetic effect.

2. The method of claim 1, further comprising requesting or receiving from the user images of facial features of the user, including at least a smile of the user.

3. The method of claim 2, wherein the images include at least one video of facial features of the user.

4. The method of claim 2, wherein the second set of instructions further guide the user to smile with an open mouth.

5. The method of claim 2, further including:
   providing the user with a survey requesting that the user describe a reason for seeking the cosmetic effect.

6. The method of claim 1, wherein the second set of instructions further guide the user to cure the durably removable composition onto the surface of the tooth.

7. The method of claim 1, further comprising:
   providing the user with a curing light, wherein the second set of instructions further guide the user to treat the durably removable composition with the curing light to cure the durably removable composition onto the surface of the tooth.

8. The method of claim 1, further comprising:
   providing the user with one or more activating substances, wherein the second set of instructions further guide the user to mix the one or more activating substances with the durably removable composition to cure the durably removable composition onto the surface of the tooth.

9. The method of claim 1, further comprising:
   providing the user with a cleaning or dehydrating solution, wherein the second set of instructions further guide the user to prepare the tooth by cleaning or dehydrating the surface of the tooth.

10. The method of claim 1, wherein the second set of instructions further guide the user to remove the disposable veneer or the durably removable composition from the surface of the tooth using upon expiration of a predetermined range of time.

* * * * *